United States Patent
Gonzaga et al.

(10) Patent No.: US 7,798,196 B2
(45) Date of Patent: Sep. 21, 2010

(54) BEAD BREAKER ROLLER HEAD FOR A TIRE MOUNTING-DEMOUNTING MACHINE

(75) Inventors: Tullio Gonzaga, Reggio Emilia (IT); Silvano Santi, Bologna (IT)

(73) Assignee: Butler Engineering & Marketing S.p.A. (IT)

( * ) Notice: Subject to any disclaimer, the term of this patent is extended or adjusted under 35 U.S.C. 154(b) by 113 days.

(21) Appl. No.: 12/211,888

(22) Filed: Sep. 17, 2008

(65) Prior Publication Data
US 2009/0101287 A1 Apr. 23, 2009

(30) Foreign Application Priority Data
Sep. 19, 2007 (IT) .......................... VR2007A0130

(51) Int. Cl.
*B60C 25/135* (2006.01)
(52) U.S. Cl. ..................................... 157/1.22; 157/1.17
(58) Field of Classification Search ............... 157/1.17, 157/1.22, 1.24, 1.3, 1.35, 1.46, 1.49, 11
See application file for complete search history.

(56) References Cited

U.S. PATENT DOCUMENTS

| | | | | |
|---|---|---|---|---|
| 3,847,197 A | * | 11/1974 | Konen | .................. 157/1.17 |
| 4,354,544 A | * | 10/1982 | Chisum | ...................... 157/1.17 |
| 4,787,433 A | * | 11/1988 | Thomas | ...................... 157/1.17 |
| 5,226,465 A | | 7/1993 | Schon et al. | |
| 6,823,922 B2 | * | 11/2004 | Gonzaga | ..................... 157/1.17 |

FOREIGN PATENT DOCUMENTS

EP  1 584 495 A2  10/2005

OTHER PUBLICATIONS

European Search Report Dated Jan. 7, 2009 in corresponding application EP 08 16 4628 (4 pages).

* cited by examiner

*Primary Examiner*—Hadi Shakeri
(74) *Attorney, Agent, or Firm*—Ostrolenk Faber LLP

(57) ABSTRACT

A tire mounting-demounting machine having a bead breaking arm with a work head having a head-holder support (10), bracket member (6) pivoted at one end thereof to the head-holder support (10), a bead breaker tool (2) supported at the other end of the at least one bracket member (6) and configured to engage a bead of a tire (P), a lever element (7) pivoted to the head-holder support (10) and bearing a feeler pin arm portion (9) configured to control the lever element (7) and a biasing member configured to yieldably keep the lever element (7) in the work position.

12 Claims, 6 Drawing Sheets

BEAD BREAKER ROLLER HEAD FOR A TIRE MOUNTING-DEMOUNTING MACHINE

FIELD OF INVENTION

The present invention regards a work head with bead breaker roller for a tire mounting-demounting machine.

BACKGROUND OF INVENTION

As is known at the state of the art, in order to carry out the demounting of the tire of a tired wheel, the latter is first loaded and locked on a rotatable wheel-holder table of a tire mounting-demounting machine, and then the bead breaking is carried out through the use of one or a pair of bead breaker rollers, i.e. the following is caused, in sequence, separating the tire beads from their respective edges of the rim owing to the pressing action of the bead breaker roller or rollers, while the wheel-holder table turns, and then causing the tire bead to surmount the edge of the rim through the use of a suitable demounting tool. In order to avoid damaging the rim or the tire and for correctly carrying out the bead breaking and demounting operations, both the bead breaker rollers and the tire mounting-demounting tools must be suitably driven.

It has already been proposed to move the bead breaker roller or rollers by means of suitable jacks set both for correctly positioning the bead breaker roller or rollers at the bead of a tire to be demounted near the edge of the rim and also for controlling them to follow a predetermined work path in an axial plane of the wheel. Nevertheless, such solutions involve active operator intervention, as such operator must in any case verify and decide when a roller thus controlled is suitably positioned on the bead in order to start the actual bead breaking process.

The European patent application EP-1 584 495 A2, in the name of the applicant of the present patent application, discloses a work head with bead breaker roller, such work head being provided with an automatic feeler pin rigidly fixed to the support of a bead breaker roller. When the bead breaker roller has been brought against the bead of a tire to be bead broken of a tired wheel, the automatic feeler pin sends an electrical control signal to the input of a control unit such that this unit processes an output control signal, which results in a moving back-approaching movement of the bead breaker roller with respect to the wheel axis until it is brought into an optimal position with respect to such axis. If the bead breaker roller is positioned in an incorrect manner with respect to the rim, e.g. when the bead breaker roller abuts against the rim or the feeler pin abuts against the flank of the tire, the feeler pin does not sent any signal to the control unit, and thus the operating sequence of the bead breaking operation is interrupted. Due to this work head, it is possible to correctly and automatically carry out bead breaking operations without running the risk that the bead breaker roller damages the surface of the rim, for example causing undesirable scoring, or the tire.

One such solution, however, involves the use of a feeler pin, as well as an electronic control unit, and is rather costly, requiring a careful maintenance in order to ensure optimal bead breaking.

SUMMARY OF THE INVENTION

The main object of the present invention is that of providing a work head with bead breaker roller for tire mounting-demounting machines which is suitable for achieving the bead breaking of a tire bead in an automatic manner and without the operator having to carry out complicated maneuvers.

Another object of the present invention is that of providing a work head with bead breaker roller for tire mounting-demounting machines which has a particularly limited and competitive production cost with respect to other already known solutions of the prior art.

These and still other objects, which will better appear below, are achieved by a work head with bead breaker roller for tire mounting-demounting machines suitable for breaking the bead of a tire from the edge of a rim of a tired wheel, comprising:

a head-holder support fixable to a bead breaker arm of a tire mounting-demounting machine;
at least one bracket member pivoted at one end thereof to the head-holder support around a pivoting axis;
a bead breaker tool supported at the other end of the at least one bracket member and designed to engage a bead of a tire to be bead broken;
a lever element, which is pivoted to the head-holder support and bears a feeler pin arm portion designed to control, in use, the lever element, whereby it is angularly moved between a work position, in which it is thrust against the bead breaker tool, and at least one rest position, in which it is angularly arranged at a distance from the bead breaker tool; and
return means designed to yieldably keep the lever in its work position.

Advantageously, the lever element is pivoted to the head-holder support in a position downstream of the pivoting axis, around an articulation axis substantially parallel to the pivoting axis.

BRIEF DESCRIPTION OF THE DRAWINGS

Further aspects and advantages of a work head according to the present invention will better appear from the following detailed description of specific embodiments thereof, description made with reference to the drawing set, in which.

In the drawings, equivalent or similar parts or components are marked with the same reference numerals.

DETAILED DESCRIPTION OF THE PREFERRED EMBODIMENTS

Figure 1:
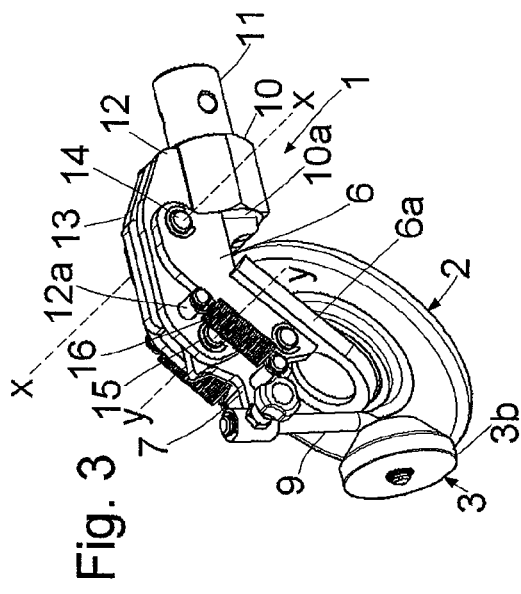
FIGS. 1 and 2 are slightly top perspective views of a work head according to the present invention in two different operating steps.
Figure 3:
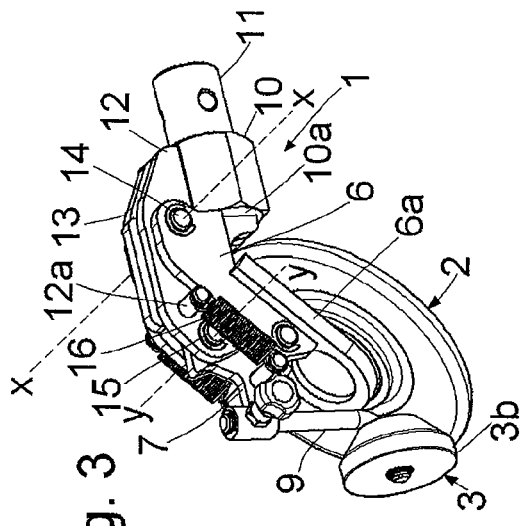
FIGS. 3 and 4 are side views with transparent parts of the work head illustrated in the operating positions of FIG. 1 and FIG. 2, respectively.

With reference first to FIGS. 1 to 4, a work head 1 with bead breaker roller 2 is illustrated for a tire mounting-demounting machine of any suitable type. The work head 1 is arranged to break or detach the bead of a tire P from the edge B1 of a rim C of a tired wheel and comprises of a plurality of components described hereinbelow.

The work head 1 first of all has a head-holder support block 10, preferably having, on one side, a shank 11 for fixing in any suitable manner to a bead breaker arm (generally being horizontally extended, not shown in the drawings) of a tire mounting-demounting machine, and, on the opposite side, one or more projections, e.g. a pair of flat and parallel projections 12 and 13. A through hole is made through the projections 12 and 13, and a pin 14 is set in such hole. The pin 14 extends through the projections 12 and 13 along a pivoting axis x-x which is transverse (perpendicular) to the bead breaker arm of the tire mounting-demounting machine.

One end of a bracket member or pair of bracket members 6 is articulated to the pin 14. The other end of the bracket members 6 supports, on one side, a plate 6a to which a bead breaker tool is idly pivoted in any suitable manner, typically a bead breaker roller 2 of any suitable type, whereas on the opposite side the bracket members 6 support a transverse pin 6b designed to act as a stop abutment, as will be explained further on. The bracket member or members 6, at their end(s) near the pin 14, have a respective projection 6c intended to abut against a head shoulder 10a of the support block 10 in order to maintain the bead breaker roller oriented along a predetermined angle, preferably roughly equal to 45° with respect to the axis of the bead breaker arm of the tire mounting-demounting machine or with respect to a vertical line.

Between the pair of projections 12 and 13, a lever element 7 is pivoted to an articulation pin 15 with articulation axis y-y parallel to the x-x axis of the pin 14, and is preferably arranged in an intermediate position between the pins 14 and 6b, i.e. downstream of the pivoting axis x-x.

Elastic or resilient return means are also provided, typically one or more pairs of traction springs 16 designed to yieldably maintain the lever element 7 in its work position, as described below. Typically, the springs 16 each have one end thereof in engagement, e.g. with a respective pin 7a projecting from the lever element 7 and the other end thereof in engagement with a respective pin 12a projecting from the projection 12, 13.

Figure 2:
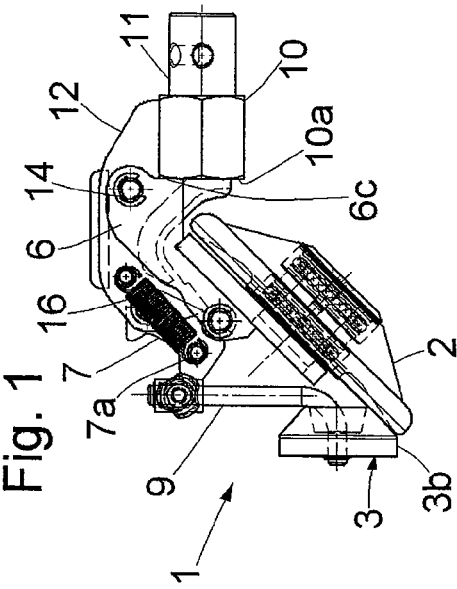
Figure 4:
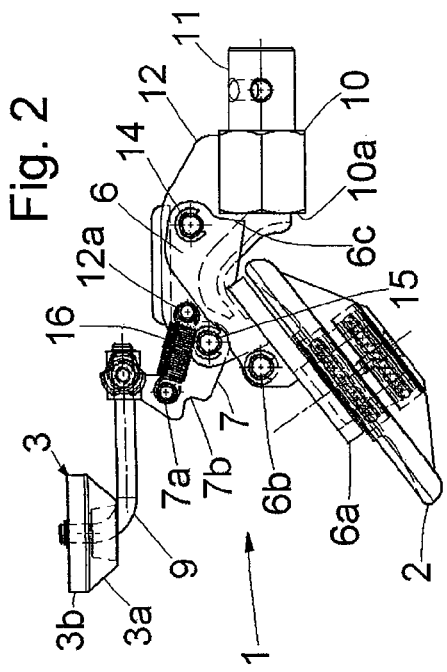

The lever element 7 supports at its head a feeler pin arm member or portion 9, which is located downstream of the pivoting fulcrum x-x and is designed to control, in use, the lever element 7, thereby being angularly moved between a work position and a rest position. While in its work position, the lever element 7 is abutted against the head-holder support 10 or against the bracket members 6 in turn abutted against the support 10, acting against the return springs 16 (FIGS. 1 and 3), whereas, while in its rest position, the lever element 7 is angularly arranged at a distance from the bead breaker tool 2 (FIGS. 2 and 4). When the lever element is located in work position, a cradle-like portion 7b is abutting against the transverse pin 6b, thereby applying a force (thrust) to the bead breaker roller.

The feeler pin arm member 9, therefore, is removably fixable at one end thereof to the lever element 7 and at its other end comprises at least one idle, articulated feeler pin roller element 3. This element 3 includes a frustoconical portion 3a and a cylindrical portion 3b, and is fit on the feeler pin arm member 9 starting from the frustoconical portion 3a.

The roller element 3 thus results pivoted between a work position, in which it is close to the bead breaker roller 2 and the cradle-like portion 7b is thrust against the bead breaker roller 2 to keep the latter in a lowered position, and an overturned position, in which the bead breaker roller 2 is free to rotate around the pin 14.

The components of the work head are sized in a manner such that when the roller element 3 is in its work position, it has frustoconical portion 3a thereof close to a portion 2a of the bead breaker roller 2 distal from the block 10, and its cylindrical portion 3b projecting with respect to the roller 2.

Figure 5:
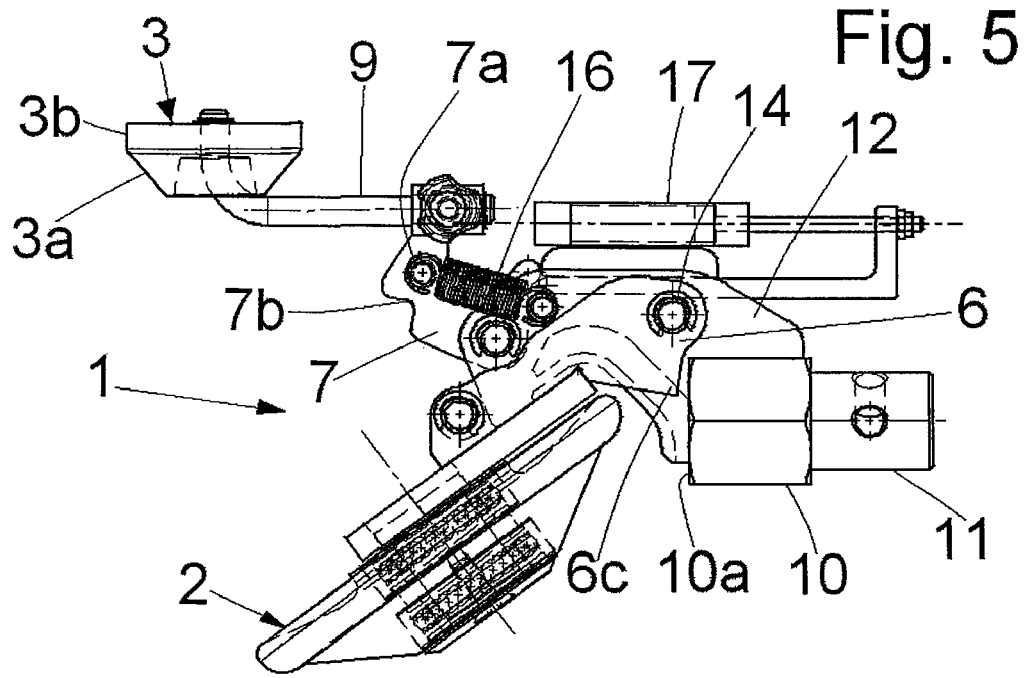
FIGS. 5 and 6 area side view with transparent parts and a slightly top perspective view, respectively, of another work head embodiment according to the present invention.
Figure 6:
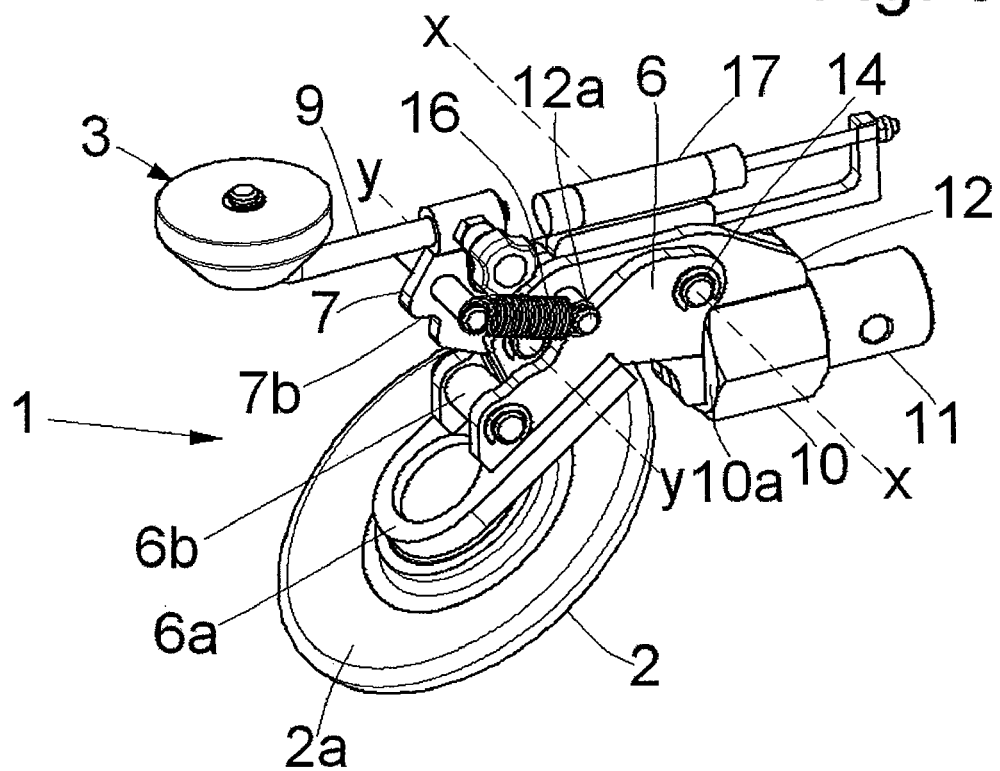
Figure 7:
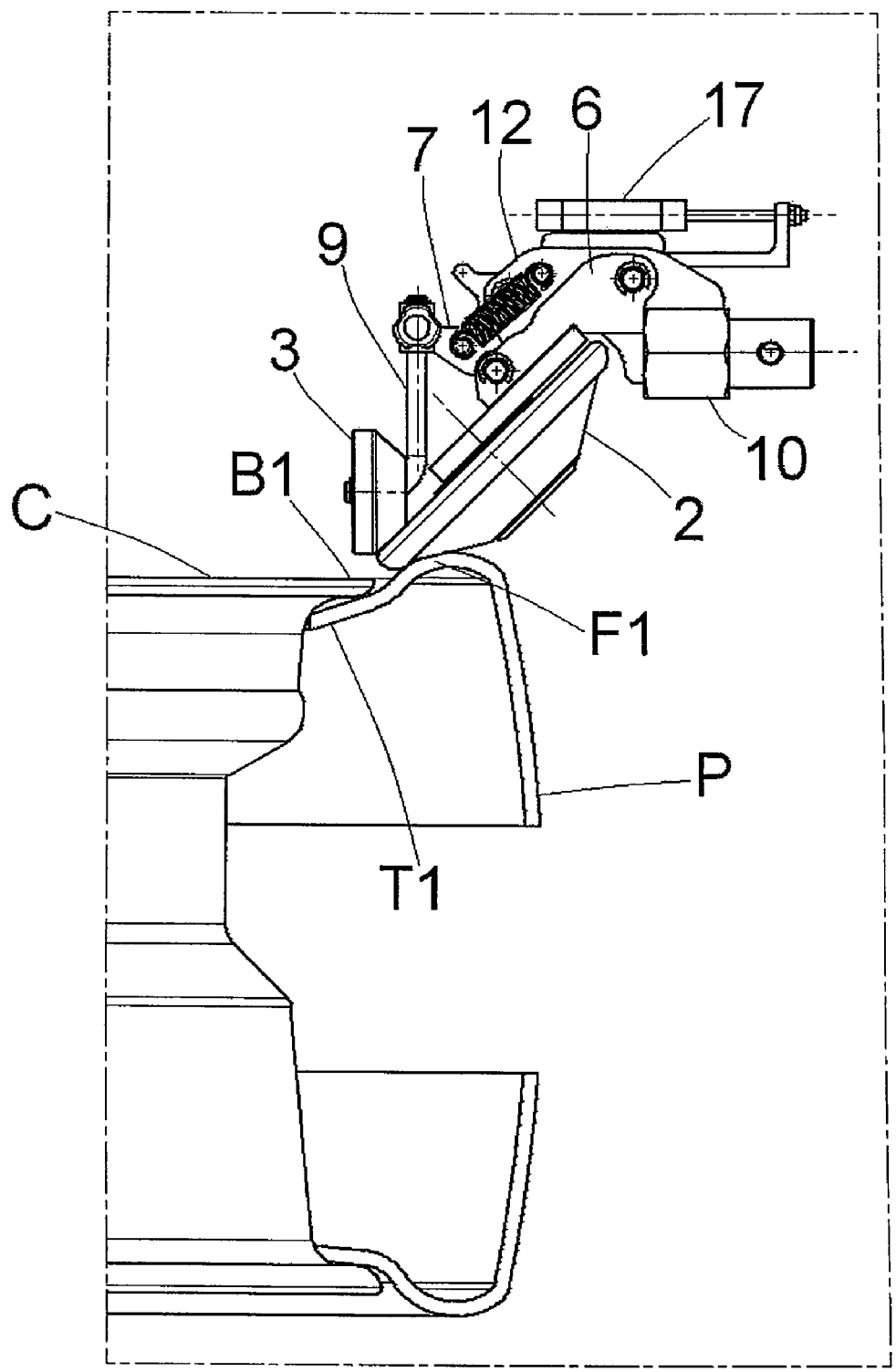
FIGS. 7 to 10 illustrate the steps of a bead breaking operation of a tire being detached from a rim edge by means of the use of a work head according to the present invention.
Figure 8:
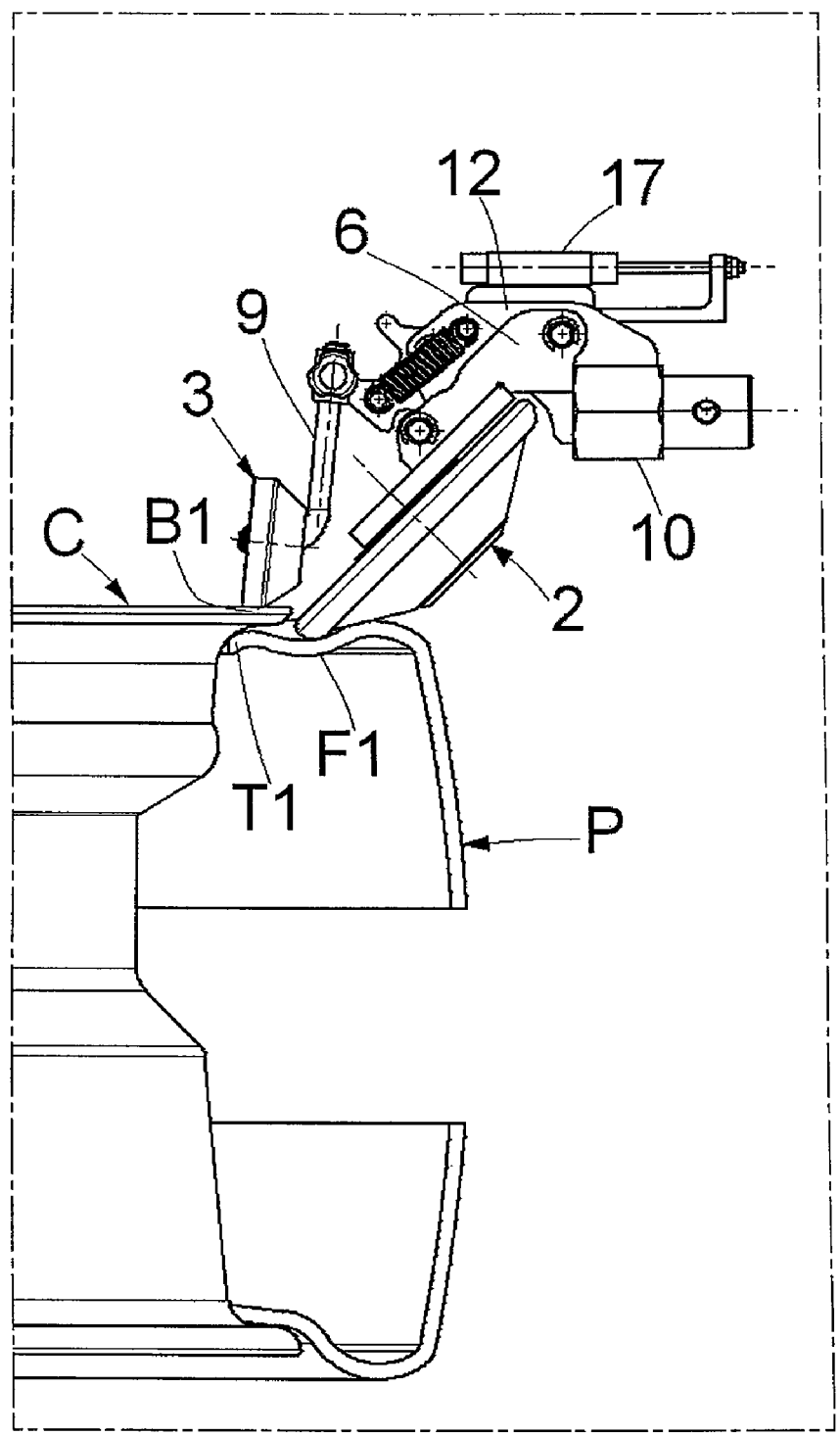

More particularly, a suitable linear actuator is prearranged between the two projections 12, 13 (as seen in particular in FIGS. 5 and 6), e.g. a pneumatic jack 17, designed to cause the feeler pin arm member 9 to rotate between the rest position and the work position.

The operation of a work head according to the present invention is described below in detail, with particular reference to FIGS. 7-10.

After having fixed a tired wheel on a wheel-holder table of a tire mounting-demounting machine, the work head is brought (e.g. by extending-retracting an overhanging telescopic arm extending from a column of the tire mounting-demounting machine) atop the wheel, and the roller element 3 is moved, e.g. manually or by means of the actuator 17, into a work position.

The operator then verifies that the cylindrical portion 3b is aligned with an outer edge portion B1 of the rim of the wheel to be bead broken, while the end 2a of the bead breaker roller 2 is substantially aligned with the flank portion F1 projecting from such edge B1 of the rim.

At this point, the work head 1 is controlled to approach (in the drawings, to move downwards) the wheel along an axis substantially parallel to the rim axis, until (see in particular FIG. 7) the end 2a of the bead breaker roller 2 engages the flank F1. Such end 2a remains, however, with the same slope with respect to the portion 10 of the block due to the thrust of the lever element 7, and is able to partly deform the flank F1, flattening it, while beginning a penetration movement between flank F1 and edge B.

Figure 9:
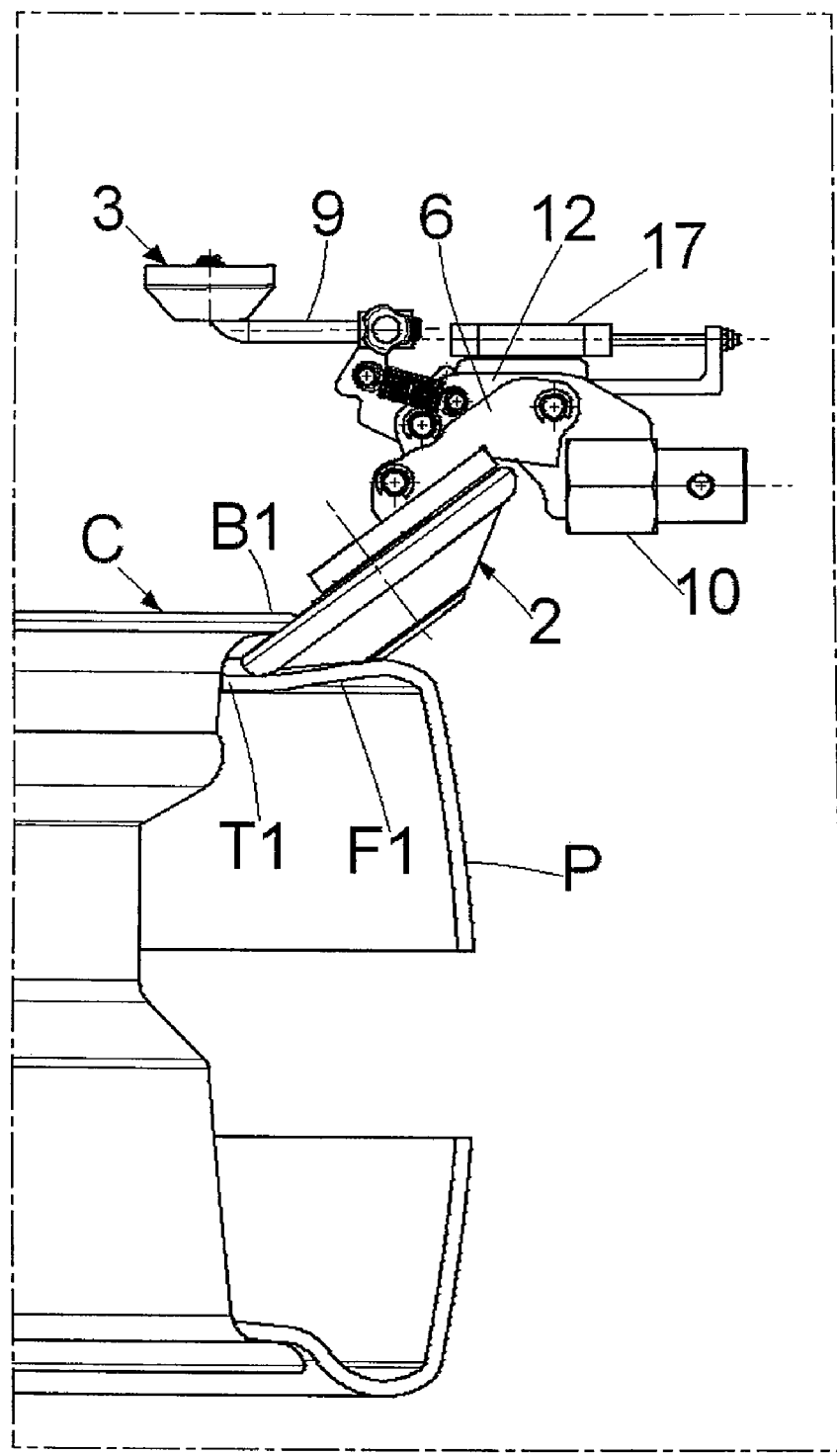
Figure 10:
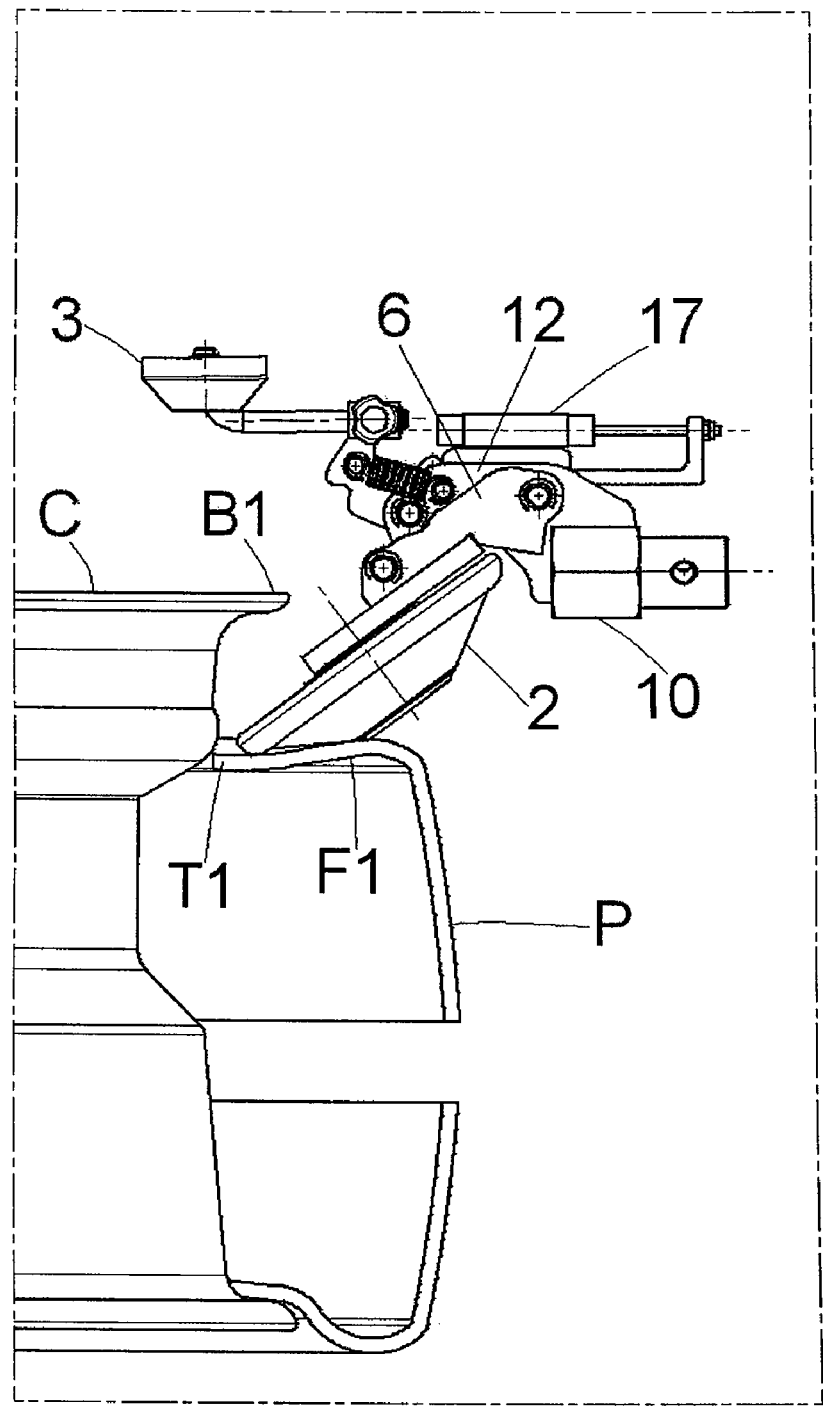

By continuing to move the work head along the axis of the rim, in the same direction, the roller element 3 and in particular the cylindrical portion 3b is brought into abutment (FIG. 8) against the edge B1 of the rim, thus causing its rotation around the y-y axis from the overturned position (FIG. 9).

The bead breaker roller 2, on the other hand, which had previously partly penetrated between edge B1 of the rim and flank F1 of the tire, is no longer maintained in position by the lever element 7. Thus, being free to rotate around the axis x-x, the bead breaker roller 2 continues its penetration path and causes the bead breaking of the bead T1 of the tire, by being controlled by the thrust exerted thereon by the tire bead itself, while remaining, on its other side, in abutment against the edge of the rim.

Upon completed bead breaking, by controlling the movement of the work head, still along the rim axis but in the opposite direction, such head is brought outside the zone between rim and tire. Then, manually or by means of actuator 17, the roller element 3 is brought back into work position, and the lever element is brought back into thrust position on the bead breaker roller 2, and the head is once again ready to start bead breaking operations.

In brief, with a work head according to the present invention, it is possible to carry out the bead braking in a substantially automatic manner. The operator must in fact only verify that the head is correctly positioned with respect to a tired wheel to be bead broken and then control the joining or approaching of the head to the wheel itself, without however having to drive the bead breaker roller between rim and tire, the penetration of the bead breaker roller, as described, being controlled by the geometry of the bead and the edge of the rim.

Thus, a work head according to the present invention makes it possible to carry out bead breaking operations in an automatic manner, without however having to use sensors or detection means of the bead breaker roller position, or control units, and at the same time requires no particular operator skill for a correct operation.

Bead breaking operations of an upper bead of a tired wheel anchored with substantially vertical rotation axis have been described. It will be clear, however, for a man skilled in the art that it is possible to carry out bead breaking operations of the lower bead of the tired wheel in the same manner, by means of a work head arranged symmetrically with that illustrated with respect to the tired wheel, or that it will be possible to carry out the bead breaking of a wheel anchored to a wheel-holder table with substantially horizontal axis of rotation.

The work head described above is susceptible to numerous modifications and variations within the protection scope as defined by the claims.

Thus, for example, the lever 7 and the feeler pin arm member 9 are integrally made of a single piece.

The invention claimed is:

1. A work head with bead breaker for a tire mounting-demounting machine having a bead breaker arm, the work head configured for bead breaking of a tire from an edge of a rim of a tired wheel, the work head comprising:
   a head-holder support configured to be secured to the bead breaker arm;
   at least one bracket member pivoted at one end thereof to said head-holder support around a pivoting axis;
   a bead breaker tool supported at a second end opposite the one end of said at least one bracket member and configured to engage a bead of the tire;
   a lever element, pivoted to said head-holder support and bearing a feeler pin arm portion configured to control, said lever element during the bead breaking, whereby the lever element is configured to be angularly moved between a work position, in which the lever element is pressed against said bead breaker tool, and at least one rest position, in which the lever element is angularly positioned at a distance from said bead breaker tool; and
   a biasing member having a first end and a second end, the biasing member being secured at the first end to the work head, and the second end positioned and configured to press, in the work position, the lever element so as to keep the lever element in the work position.

2. The work head according to claim 1, wherein said lever element is pivoted to said head-holder support at a position distal to said pivoting axis, the lever element being pivoted around an articulation axis parallel to the pivoting axis.

3. The work head according to claim 2, wherein said feeler pin arm portion is positioned distally of said articulation axis and extends in a direction transverse to said articulation axis.

4. The work head according to claim 1, wherein said feeler pin arm portion is removably fixable at one end thereof to said lever element.

5. The work head according to claim 4, wherein said feeler pin arm portion is borne by said lever element distal to said pivoting axis.

6. The work head according to claim 4, wherein said feeler pin arm portion comprises at a distal end thereof at least one idle feeler pin roller element.

7. The work head according to claim 6, wherein said at least one idle feeler pin roller element is articulated around a rotation axis transverse to said pivoting axis of said at least one bracket member.

8. The work head according to claim 6, wherein said at least one idle feeler pin roller element comprises a frustoconical portion configured to abut against the edge of the rim.

9. The work head according to claim 1, wherein said bead breaker tool comprises a frustoconical roller supported in an idle manner such that the frustoconical roller is rotatable around a rotation axis perpendicular to said pivoting axis and such that, in use, the frustoconical roller is tilted 45° with respect to the vertical.

10. The work head according to claim 1, further comprising an actuator configured to angularly move said lever element between said rest position and said work position.

11. The work head according to claim 1, wherein said return biasing member comprises at least one elastically pliable element.

12. The work head according to claim 1, further comprising a pin positioned transverse to the at least one bracket member,
    wherein said at least one bracket member supports the transverse pin, and
    wherein said lever element includes a cradle-like portion configured to abut against said transverse pin when said lever element is positioned in said work position.

* * * * *